Sept. 5, 1933. C. D. HELLYER 1,925,382
VALVE RESEATING TOOL
Filed Jan. 14, 1929
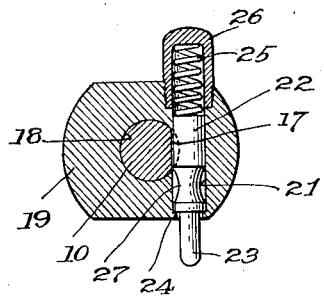
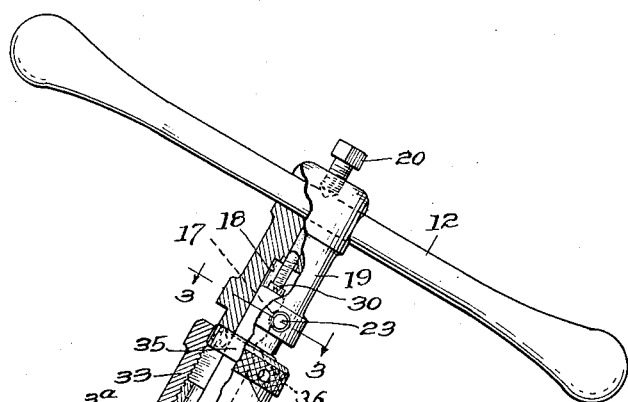
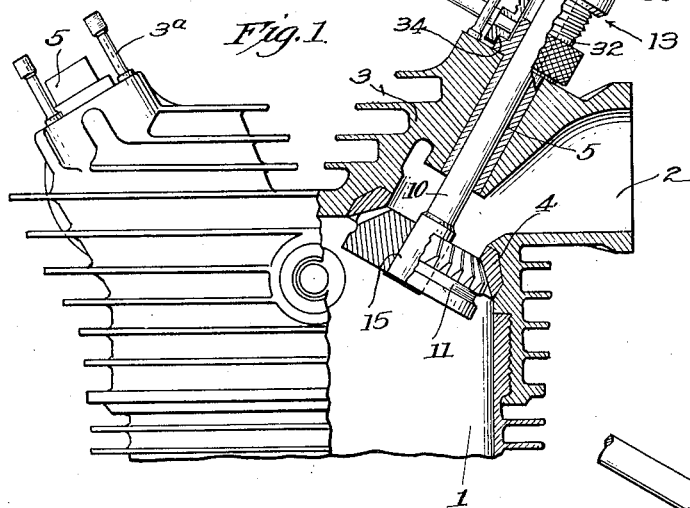
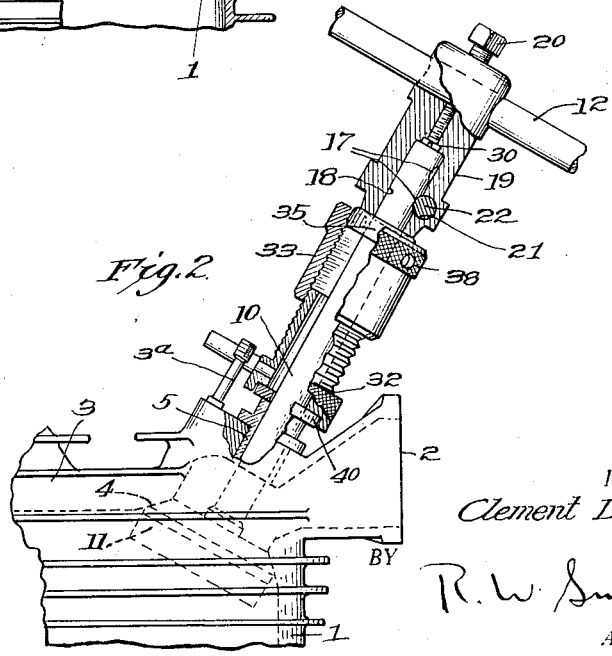
INVENTOR.
Clement D. Hellyer,
BY
ATTORNEY.

Patented Sept. 5, 1933

1,925,382

UNITED STATES PATENT OFFICE 1,925,382

VALVE RESEATING TOOL

Clement D. Hellyer, Los Angeles, Calif.; Fannie E. Hellyer, administratrix of said Clement D. Hellyer, deceased, assignor to Ross Meunier, Los Angeles, Calif.

Application January 14, 1929. Serial No. 332,306

17 Claims. (Cl. 90—12.5)

This invention is a valve reseating tool particularly adapted for use in reaming the valve seats of an internal combustion engine having interior valves, or more particularly an internal combustion engine of the type having intake and exhaust ports provided with valve seats at the inner surfaces of the cylinder heads and adapted for outward movement of the cooperating valve stems to seat the valves.

It is the object of the invention to provide a tool adapted for ready assembly in operative position and including a reamer mounted on a pilot which is adapted for projection through the valve stem guide in the cylinder head of the engine so as to engage the reamer with the interior valve seat, and having an operating handle detachably mounted on the outwardly projecting end of the pilot for rotating the reamer while held against the valve seat, with expanding means preferably mounted on the pilot between the handle and the cylinder head and cooperating with said parts for axially feeding the rotating cutter against the work.

The invention also provides for operative assembly of the expanding means and the rotatable tool so as to form a unitary structure which will insure concentric rotation of the pilot without vibration or eccentric play, and which will also maintain precise axial alinement of the pilot with a cooperating valve stem guide, thereby reseating the valves exactly perpendicularly to their valve stem guides and providing smooth and even seats without chatter marks.

In assembling the tool the pilot with the reamer mounted on its inner end must be inserted through the inner end of the engine cylinder in order to project the pilot outwardly through the valve stem guide and seat the cutter against the work, and the maximum length of the pilot is thus limited by the necessity of it being tilted in the restricted cylinder bore so as to project it through the angularly disposed valve stem guide, and the operating handle can thus engage only the restricted length of the pilot which projects beyond the valve stem guide. It is therefore a particular object of the invention to provide a quick-detachable connection between the pilot and operating handle which will readily operatively engage the limited projecting pilot end and provide a sturdy and rigid driving connection for rotating the pilot and reamer, and which will also positively lock the handle and pilot against relative axial movement so as to permit the reamer being drawn tightly against the valve seat.

It is a further particular object of the invention to engage the operating handle with the projecting end of the pilot so as to appreciably space the inner end of the handle from the cylinder head of the engine, and to mount a suitable expanding means on the pilot in said space so that expansion thereof will cause opposite end thrust against the cylinder head and handle for axially tensioning the pilot so as to feed the reamer toward the valve seat. The expanding means may comprise a usual screw-jack adapted for manual adjustment, and the use thereof adapts the tool for operative assembly on engines having cylinder heads of different thickness, since with different lengths of the pilot projecting beyond the cylinder head in accordance with the various engines upon which the tool is employed, corresponding expansion of the jack will maintain opposite end thrust against the cylinder head and the operating handle for holding the reamer tightly against the work.

In order to provide still further adjustment of the tool so as to adapt it for use on engines having varying lengths of valve stem guides, the locking connection between the operating handle and the pilot may engage the pilot at axially spaced points along its length in order to insure sufficient spacing of the handle from the outer surface of the cylinder head to permit operative mounting of the expanding means on the pilot, and this adjustable locking connection between the handle and pilot is preferably provided with a stop adapted for adjustment to insure the pilot being engaged at a predetermined point along its length.

The invention preferably also provides for increasing the length of the expanding means or jack beyond its normal limit of expansion, so as to insure end thrust against the operating handle when the tool is used on an engine having such a short valve stem guide that even maximum axial adjustment of the locking connection between the handle and pilot would not otherwise sufficiently axially restrict the space occupied by the jack to insure the desired end thrust.

It is a still further object of the invention to provide an expanding means or jack which is of extremely simple construction and adapted for convenient operative mounting and ready manual adjustment, and which preferably includes an anti-frictional end thrust engagement with the operating handle so that the latter may freely rotate the pilot and reamer.

The invention also provides for locking the pilot relative to its operating handle so that while the handle socket is adapted to operatively engage the restricted projecting length of the pilot end, it will still clear any projections on the cylinder head of the engine adjacent the valve stem guide and will thus permit free rotation of the handle, and the locking connection between the handle socket and the pilot is also adapted to provide a positive lock against both rotary and axial movement without the necessity of materially reducing the cross-sectional area of the pilot at the locking engagement. This is particularly advantageous since the usual pilot is round in cross-section in order to snugly engage the corresponding cylindrical valve stem guide, and is of limited cross-sectional diameter in order that it may be received in the cooperating valve stem guide which is usually of appreciably restricted diameter, and by providing a locking engagement which requires no appreciable cutting away of a part of the already diametrically limited end of the pilot, the tool may be operated without liability of the pilot end being twisted off.

Further objects of the invention will be readily understood from the following description of the accompanying drawing, in which:

Fig. 1 is a side elevation of the tool, partly in axial section and showing the tool assembled for use on an internal combustion engine.

Fig. 2 is a similar fragmentary view showing the tool adjusted to an engine having a valve stem guide of different length.

Fig. 3 is a transverse section on the line 3—3 of Fig. 1.

The tool is adapted for use in connection with internal combustion engines wherein the engine cylinders 1 have angularly disposed intake and exhaust ports 2 in the cylinder heads 3, and the seats 4 for the intake and exhaust valves are at the inner ends of ports 2 facing toward the cylinder bores, with the stems for the valves which engage these seats adapted to extend outwardly through valve stem guides 5 so as to seat the valves by outward projection of the valve stems.

The invention provides for reaming the valve seats 4 after first removing the valves and their stems, and includes a pilot 10 carrying a reamer 11 at its inner end, and adapted for insertion through the inner end of cylinder 1 for projection outwardly through the valve stem guide 5 so as to engage the reamer with the valve seat 4. An operating handle 12 is detachably fixed to the projecting end of the pilot for rotating the reamer on the valve seat, and an expanding means is preferably mounted on the projecting end of the pilot between the handle 12 and the outer surface of cylinder head 3 so that expansion of the jack will tension the pilot for drawing the rotating reamer tightly against the valve seat. The expanding means may be of any desired type, but is preferably a means adapted for non-yielding axial expansion, i. e. a means adapted for positive axial expansion and then held against axial contraction until intentionally released. In the present embodiment such a non-yielding expanding means is shown as a screw-jack 13.

The pilot 10 is preferably adapted for detachable mounting of the reamer 11 on its inner end, and for this purpose the inner end of the pilot may comprise a slightly tapering head 15 adapted for wedging reception of the reamer so as to bind the reamer against either axial or rotary displacement on the pilot when the latter is tensioned in an outward direction for drawing the reamer against the valve seat. The pilot is preferably of approximately the maximum length compatible with its insertion and tilting in the restricted cylinder bore 1 so as to project it outwardly through the angularly disposed valve stem guide 5, and the handle 12 engages the end of the pilot which projects beyond the outer surface of cylinder head 3, with said engagement adapted to provide a positive locking connection at the restricted length of the projecting pilot end which is available for said operative engagement.

As an instance of this locking engagement the pilot may be transversely notched adjacent its outer end as shown at 17, with said outer end of the pilot adapted for reception in the bore 18 of a socket member 19 through the outer end of which the handle 12 transversely projects and is held in place by a set-screw 20. A transverse bore 21 extends into the socket member 19 adjacent its inner end and slightly to one side of the longitudinal axis of the socket member so that the inner side of bore 21 opens into the bore 18 as shown in Fig. 3, and a plunger 22 is insertable in the open end of bore 21 with a longitudinal operating pin 23 at the forward end of the plunger projecting outwardly beyond socket member 19 through a restricted prolongation of the bore 21 forming a shoulder 24 adapted for abutment by the plunger for limiting its longitudinal movement in the direction projecting the operating pin.

Means are provided for projecting the operating pin, and for this purpose a coil spring 25 may engage the rear end of the plunger and may be held relative to socket member 19 by a cap 26 which is adapted for reception over the spring and may be fixed relative to socket member 19 by being threaded into the open end of bore 21. An annular groove 27 is provided in plunger 22 adjacent its forward end for respective alinement or non-alinement with bore 18 when the plunger is retracted by pressing pin 23 or is in normal spring projected position, so that when the end of pilot 10 is inserted in socket member 19 the alinement of groove 27 with bore 18 will permit free axial shifting of the pilot to aline its notch 17 with the bore 21, in order that subsequent non-alinement of groove 27 with bore 18 may engage the plunger 22 in notch 17 as shown in Fig. 3, and thereby positively lock the pilot against both axial and turning movement relative to the operating handle 12.

In practice the end of the pilot is preferably provided with a plurality of the notches 17, suitably longitudinally spaced so that by alining one or the other of the notches with the bore 21 the socket member of the operating handle may be locked in axially adjusted position relative to the pilot as shown in Figs. 1 and 2, and to insure accurate alinement of a desired one of the notches 17 with the locking plunger in bore 21, a stop which is shown as a screw 30 may be longitudinally adjustably mounted in the inner end of the bore 18 so as to form an abutment for the end of the pilot.

The jack 13 which is preferably mounted on the pilot between the cylinder head of the engine and the operating handle 12, is shown as comprising telescopic threaded sleeves 32—33 having an open bore for the pilot, with the outer end of the bore of the lower sleeve 32 preferably countersunk as shown at 34 for reception over the usual shouldered end of the valve stem guide 5 which projects slightly beyond the outer surface of the cylinder head 3, and the outer end of the bore of the upper sleeve 33 is preferably provided with an anti-frictional end thrust bearing 35 having a bore which is preferably slightly concave, with the end thrust bearing adapted to engage the end of socket member 19 which may be slightly convex as shown at 36 to insure ready and accurate alinement of the parts. The sleeve 32 is held against rotation, preferably by a radially projecting pin 37 adapted for abutment against one of the usual stud bolts 3ª which project from the cylinder head 3, and the sleeve 33 is adapted for threaded adjustment relative to the stationary sleeve 32, preferably by providing the sleeve 33 with a knurled manually engageable head 38, so as to expand the jack against the socket member 19 which has the pilot 10 axially locked relative thereto, and thereby tension the pilot so as to feed the reamer 11 toward the valve seat 4 while rotating the reamer by turning the operating handle 12.

Longitudinal expansion of jack 13 adapts the tool for operative assembly on engine cylinders having heads of different thickness resulting in variable projection of pilot 10 beyond the different cylinder heads as shown in Figs. 1 and 2, and if the plurality of longitudinally spaced notches 17 on the pilot 10 do not afford sufficient axial adjustment between the pilot and its operating handle to insure longitudinal tensioning of the pilot by maximum expansion of the jack, a spacing element may be inserted between the jack and the cylinder head 3 to insure tensioning abutment of the expanded jack against the socket member 19. The spacing element is shown as a washer 40 adapted for reception in the countersunk end 34 of the bore of sleeve 32 so as to abut against the end of the valve stem guide 5 as shown in Fig. 2, thereby spacing the sleeve 32 from the outer surface of the cylinder head 3 so that the expanded jack will occupy a correspondingly increased longitudinal space.

In operation the pilot 10 carrying the reamer 11 is inserted through the inner end of cylinder 1 for projection of the pilot through valve stem guide 5, and the jack 13, with or without the interposed washer 40, is mounted on the projecting end of the pilot and the handle 12 is then fixed in operative position by reception of the socket member 19 over the restricted length of the pilot which projects beyond the jack. The operating handle 12 is positively held against both axial and turning movement relative to the pilot by operative engagement of plunger 23 in one of the notches 17; and the axial adjustment provided by the plurality of longitudinally spaced notches, together with the longitudinal spacing of the jack which is made possible by the use or non-use of washer 40, is so employed as to insure abutment of the partially contracted jack against the socket member 19 for seating the reamer 11 against valve seat 4, irrespective of such variations in the length of the projecting pilot end as will result from use of the tool upon engines of different design having valve stem guides of different length.

Manual engagement and turning of handle 12 will thus rotate the reamer 11 against the valve seat 4, and the rotating reamer may be drawn toward its work by turning the sleeve 33 so as to expand the jack against socket member 19 for axially tensioning the pilot, thereby providing a quick cutting action and a finished valve seat having a uniform surface without chatter marks. The invention adapts the tool for ready assembly by the quick-detachable locking engagement provided by the yieldably projected plunger 23 engaging one of the notches 17 in the pilot end, and this locking engagement may be used at the relatively short length of the pilot end which is available for reception in socket member 19, and still insure the handle and pilot being positively held against both rotary and axial relative movement.

While the herein described locking means comprising the retractable plunger 22, is the preferred means for insuring the desired positive and sturdy locking connection for the pilot 10, it will be apparent that various modifications of this quick-releasable locking engagement may be employed as long as the locking connection positively locks the pilot against both rotary and axial movement when said locking means engages the restricted length of pilot end which is adapted for reception in the handle socket; and it will also be apparent that various changes may be made in the details of construction and combination of the other elements of the invention within the scope of the appended claims.

It will also be noted that the locking engagement for the pilot includes as an essential feature an arrangement whereby the locking means engages a slightly recessed side of the pilot end so as to positively lock the pilot against both rotary and axial movement, and that the pilot may consequently be of usual diametrically restricted cylindrical form adapting it for snug projection through valve stem guide 5 without the possibility of the slight cutting away of only one of its sides to form the locking engagement in any way weakening the diametrically limited pilot end to such a degree as would be liable to result in the pilot end being twisted off.

It will further be noted that the provision of a locking connection between the handle and pilot wherein a socket member is adapted for axial reception over the usual cylindrical pilot end and is then locked against both rotary and axial movement, permits the socket member being of a length which will insure the transverse handle 12 being spaced beyond any projections on the cylinder head such as stud bolts 3ª, in order that the handle may be freely turned for rotating the cutter without abutment against such projections.

The projecting end of pilot 10 preferably has a sliding fit through the antifriction-bearing 35 at the upper end of the expanding jack as shown in Fig. 1, and the jack 13 is adapted to be held in exact axial alinement with valve stem guide 5 by the engagement of its countersunk end 34 as also shown in Fig. 1; and this arrangement, together with the abutment of socket 19 and the expanding jack at the cooperating bearing faces formed by the antifriction-bearing 35 and the convex end 36 of the socket, insures a rigidly alined unitary tool whereby the pilot 10 is rotated exactly concentric with valve stem guide 5 and with no chattering or transverse play. This non-vibrating rotation of the pilot is assured irrespective of any unequal pressure applied to the ends of handle 12, since the bearing-face 36 engaging the antifriction-bearing 35 will compensate for such unequal pressure tending to non-aline the projecting end of the pilot, which will thus be securely held in axial alinement with valve stem guide 5 by means of the jack 13, and the inner end of the pilot will be similarly held in alinement with the valve stem guide, by its snug sliding fit therein. The reamer 11 will thus reseat the valves exactly perpendicularly to their valve stem guides, and will insure smoothly finished valve seats having no chatter marks.

I claim:—

1. A valve reseating tool comprising a pilot having a reamer mounted thereon and adapted for insertion in a cylinder of an engine for projection outwardly through a valve stem guide in the cylinder head so as to engage the reamer with an internal valve seat in the cylinder, an operating handle including a socket having a longitudinal bore adapted to receive the outwardly projecting end of the pilot, quick-releasable means adapted to engage the projecting end of the pilot for locking it in the socket against both longitudinal and turning movement, and means longitudinally spaced along the projecting end of the pilot adapted for selective engagement by the locking means.

2. A valve reseating tool comprising a pilot having a reamer mounted thereon and adapted for insertion in a cylinder of an engine for projection outwardly through a valve stem guide in the cylinder head so as to engage the reamer with an internal valve seat in the cylinder, an operating handle including a socket having a longitudinal bore adapted to receive the outwardly projecting end of the pilot, quick-releasable means adapted to engage the projecting end of the pilot for locking it in the socket against both longitudinal and turning movement, means longitudinally spaced along the projecting end of the pilot adapted for selective engagement by the locking means, and an adjustable stop for limiting insertion of the pilot end in the socket so as to aline a predetermined one of said longitudinally spaced means with the quick-releasable locking means.

3. A valve reseating tool comprising a pilot having a reamer mounted thereon and adapted for insertion in a cylinder of an engine for projection outwardly through a valve stem guide in the cylinder head so as to engage the reamer with an internal valve seat in the cylinder, an operating handle, a socket cooperating with the handle and having a longitudinal bore adapted to receive a restricted length of the outwardly projecting end of the pilot so as to appreciably axially space the socket from the cylinder head of the engine, quick-releasable means adapted to engage the restricted length of the pilot end for locking the pilot in the socket against longitudinal movement, and means separate and distinct from the pilot but cooperating therewith for outwardly tensioning the pilot so as to draw the reamer toward the valve seat, said tensioning means including longitudinally telescopic elements having cooperating screw threads, one of said elements comprising a rigid sleeve adapted for mounting on the outwardly projecting end of the pilot for abutment against the cylinder, and the other of said elements being arranged for cooperation with the socket so as to outwardly longitudinally shift the socket dependently with said element.

4. A valve reseating tool comprising a pilot having a reamer mounted thereon and adapted for insertion in a cylinder of an engine for projection outwardly through a valve stem guide in the cylinder head so as to engage the reamer with an internal valve seat in the cylinder, an operating handle including a socket having a longitudinal bore adapted to receive a restricted length of the outwardly projecting end of the pilot so as to appreciably axially space the socket from the cylinder head of the engine, quick-releasable means adapted to engage the restricted length of the pilot end for locking the pilot in the socket against both longitudinal and turning movement, and a screw-jack adapted for mounting on the pilot in said axial space so as to engage the socket and the cylinder head at its respective ends for tensioning the pilot and thereby drawing the reamer toward the valve seat by axially expanding the jack.

5. A valve reseating tool comprising a pilot having a reamer mounted thereon and adapted for insertion in a cylinder of an engine for projection outwardly through a valve stem guide in the cylinder head so as to engage the reamer with an internal valve seat in the cylinder, an operating handle including a socket having a longitudinal bore adapted to receive a restricted length of the outwardly projecting end of the pilot so as to appreciably axially space the socket from the cylinder head of the engine, quick-releasable means adapted to engage the restricted length of the pilot end for locking the pilot in the socket against both longitudinal and turning movement, expansible means adapted for mounting in the said axial space, a spacing element adapted for mounting between said expansible means and the cylinder head of the engine so as to abut the opposite end of the expansible means against the handle socket for tensioning the pilot and thereby drawing the reamer toward the valve seat by axially expanding said expansible means.

6. A valve reseating tool comprising a pilot having a reamer mounted thereon and adapted for insertion in a cylinder of an engine for projection outwardly through a valve stem guide in the cylinder head so as to engage the reamer with an internal valve seat in the cylinder, an operating handle including a socket having a longitudinal bore adapted to receive a restricted length of the outwardly projecting end of the pilot so as to appreciably axially space the socket from the cylinder head of the engine, quick-releasable means adapted to engage the restricted length of the pilot end for locking the pilot in the socket against both longitudinal and turning movement, means for adjusting said locking engagement lengthwise of the pilot so as to maintain substantially the same axial spacing of the socket from the cylinder head of the engine irrespective of variations in the length of the pilot end projecting beyond said cylinder head, and means adapted for mounting in said axial space so as to engage the socket and the cylinder head at its respective ends and adapted for axial expansion to tension the pilot and thereby draw the reamer toward the valve seat.

7. A valve reseating tool comprising a pilot having a reamer mounted thereon and adapted for insertion in a cylinder of an engine for projection outwardly through a valve stem guide in the cylinder head so as to engage the reamer with an internal valve seat in the cylinder, an operating handle including a socket having a longitudinal bore adapted to receive a restricted length of the outwardly projecting end of the pilot so as to appreciably axially space the socket from the cylinder head of the engine, quick-releasable means adapted to engage the restricted length of the pilot end for locking the pilot in the socket against both longitudinal and turning movement, means for adjusting said locking engagement lengthwise of the pilot so as to maintain substantially the same axial spacing of the socket from the cylinder head of the engine irrespective of variations in the length of the pilot end projecting beyond said cylinder head, expansible means adapted for mounting in said axial space, a spacing element adapted for mounting between said expansible means and the cylinder head of the engine so as to abut the opposite end of the expansible means against the handle socket for tensioning the pilot and thereby drawing the reamer toward the valve seat by axially expanding said expansible means.

8. A valve reseating tool comprising a pilot having a reamer mounted thereon and adapted for insertion in a cylinder of an engine for projection outwardly through a valve stem guide in the cylinder head so as to engage the reamer with a valve seat in the cylinder, an operating handle including a socket having a longitudinal bore adapted to receive a restricted length of the outwardly projecting end of the pilot, said socket having a transverse bore opening into its longitudinal bore, a locking plunger axially slidable in said transverse bore and having an annular groove adapted for alinement or non-alinement with said longitudinal bore by retraction or projection of the plunger, the alinement of the annular groove with said longitudinal bore permitting free axial movement of the pilot end in said bore, and said pilot end having a plurality of longitudinally spaced transverse notches adapted for selective alinement with said transverse bore for engagement of the projected plunger in the alined notch so as to lock the pilot in axially adjusted position relative to the handle socket and against both longitudinal and turning movement relative to said handle.

9. A valve reseating tool comprising a pilot having a reamer mounted thereon and adapted for insertion in a cylinder of an engine for projection outwardly through a valve stem guide in the cylinder head so as to engage the reamer with an internal valve seat in the cylinder, an operating handle including a socket having a longitudinal bore adapted to receive a restricted length of the outwardly projecting end of the pilot so as to appreciably axially space the socket from the cylinder head of the engine, quick-releasable means adapted to engage the restricted length of the pilot end for locking the pilot in the socket against both longitudinal and turning movement, and a screw-jack adapted for mounting on the pilot in said axial space so as to engage the socket and the cylinder head at its respective ends for tensioning the pilot and thereby drawing the reamer toward the valve seat by axially expanding the jack, the end of the jack which engages the socket including an end-thrust anti-frictional bearing.

10. A valve reseating tool comprising a pilot having a reamer mounted thereon and adapted for insertion in a cylinder of an engine for projection outwardly through a valve stem guide in the cylinder head so as to engage the reamer with an internal valve seat in the cylinder, an operating handle including a socket having a longitudinal bore adapted to receive a restricted length of the outwardly projecting end of the pilot so as to appreciably axially space the socket from the cylinder head of the engine, quick-releasable means adapted to engage the restricted length of the pilot end for locking the pilot in the socket against both longitudinal and turning movement, and a screw-jack having an open bore adapted to receive the pilot for mounting the jack in said axial space so as to engage the socket and the cylinder head by the respective ends of the jack for tensioning the pilot and thereby drawing the reamer toward the valve seat by axially expanding the jack, the end of the socket being convex for reception in the open end of the bore of the jack.

11. A valve reseating tool comprising a pilot having a reamer mounted thereon and adapted for insertion in a cylinder of an engine for projection outwardly through a valve stem guide in the cylinder head so as to engage the reamer with an internal valve seat in the cylinder, an operating handle including a socket having a longitudinal bore adapted to receive a restricted length of the outwardly projecting end of the pilot so as to appreciably axially space the socket from the cylinder head of the engine, quick-releasable means adapted to engage the restricted length of the pilot end for locking the pilot in the socket against both longitudinal and turning movement, and a screw-jack comprising telescopic threaded sleeves and adapted for mounting on the pilot in said axial space so as to engage the socket and the cylinder at its respective ends for tensioning the pilot and thereby drawing the reamer toward the valve seat by telescopic adjustment of said sleeves, one of said sleeves having a radial projection adapted for rotary abutment against a projection on the cylinder head to hold said sleeve against turning and thereby cause said telescopic adjustment of the threaded sleeves by rotating the cooperating sleeve.

12. A valve reseating tool comprising a pilot having a reamer mounted thereon and adapted for insertion in a cylinder of an engine for projection outwardly through a valve stem guide in the cylinder head so as to engage the reamer with a valve seat in the cylinder, a bearing sleeve adapted for sliding fit on the projecting end of the pilot and adapted to engage the valve stem guide for axial alinement therewith, and an operating handle at the end of the pilot which projects outwardly beyond said bearing sleeve, the said operating handle and the bearing sleeve having cooperating rounded bearing faces adapted to compensate for any tendency to non-aline the pilot as a result of unequal pressure applied to the handle.

13. A valve reseating tool comprising a pilot having a reamer mounted thereon and adapted for insertion in a cylinder of an engine for projection outwardly through a valve stem guide in the cylinder head so as to engage the reamer with a valve seat in the cylinder, a bearing sleeve adapted for sliding fit on the projecting end of the pilot and adapted to engage the valve stem guide for axial alinement therewith, and an operating handle at the end of the pilot which projects outwardly beyond said bearing sleeve, the said operating handle and the bearing sleeve having anti-frictional cooperating rounded bearing faces adapted to compensate for any tendency to non-aline the pilot as a result of unequal pressure applied to the handle.

14. A valve reseating tool comprising a pilot having a reamer mounted thereon and adapted for insertion in a cylinder of an engine for projection outwardly through a valve stem guide in the cylinder head so as to engage the reamer with an internal valve seat in the cylinder, means for rotating the pilot including a socket adapted to engage the outwardly projecting end of the pilot, means for releasably locking the socket against longitudinal movement relative to the pilot, expansion means tending to force the socket axially away from the cylinder head so as to tension the pilot for drawing the reamer toward the valve seat, said expansion means comprising cooperating threaded elements mounted on the cylinder head, and a radial projection on one of said elements adapted for rotary abutment against a projection on the cylinder head.

15. A valve reseating tool for a valve of a cylinder of an engine which has a valve stem guide forming a shouldered projection extending outwardly beyond the cylinder, the tool comprising a pilot having a reamer mounted thereon and adapted for projection of the pilot through the valve stem guide for engaging the reamer with the seat of the valve, a bearing sleeve adapted for sliding fit on the end of the pilot which projects outwardly beyond the valve stem guide, the end of the sleeve being countersunk so as to telescopically overlie and engage the shouldered projection of the valve stem guide for alining the bearing sleeve with the valve stem guide, and an operating handle engaging the end of the pilot which projects outwardly beyond the bearing sleeve.

16. A valve reseating tool comprising a pilot having a reamer mounted thereon and adapted for insertion in a cylinder of an engine for projection outwardly through a valve stem guide in the cylinder head so as to engage the reamer with a valve seat in the cylinder, cooperating telescopic elements adapted for mounting on the outwardly projecting end of the pilot with one of said elements longitudinally abutting against the cylinder head, a connection between the other of said elements and the outer end of the pilot whereby relative longitudinal expansion of the cooperating telescopic elements is adapted to longitudinally tension the pilot for drawing the reamer toward the valve seat, means for longitudinally expanding said cooperating elements by relative rotation thereof, and a radial projection on that element which longitudinally abuts against the cylinder head, said projection being adapted for rotary abutment against a cooperating projection on the cylinder head.

17. A valve reseating tool comprising a pilot having a reamer mounted thereon and adapted for insertion in a cylinder of an engine for projection outwardly through a valve stem guide in the cylinder head so as to engage the reamer with an internal valve seat in the cylinder, a screw-jack comprising cooperating telescopic elements separate and distinct from the pilot and having a threaded engagement adapted to longitudinally expand and contract the screw-jack by relative rotation of said elements, the screw-jack being adapted for removable mounting on the projecting end of the pilot with one element of the screw-jack comprising a rigid sleeve abutting against the cylinder head, a connection between the other element of the screw-jack and the outer end of the pilot whereby relative longitudinal expansion of the cooperating telescopic elements is adapted to longitudinally tension the pilot for drawing the reamer toward the valve seat, said connection including a socket adapted to receive the outer end of the pilot, and means for releasably locking the socket against longitudinal movement relative to the pilot.

CLEMENT D. HELLYER.